(12) United States Patent
Huang

(10) Patent No.: US 7,724,452 B2
(45) Date of Patent: May 25, 2010

(54) OPTICAL LENS ASSEMBLY AND LENS MODULE

(75) Inventor: Chien-Feng Huang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 12/248,287

(22) Filed: Oct. 9, 2008

(65) Prior Publication Data

US 2009/0225446 A1    Sep. 10, 2009

(30) Foreign Application Priority Data

Mar. 5, 2008    (CN) .................. 2008 1 0300476.1

(51) Int. Cl.
*G02B 7/02* (2006.01)
(52) U.S. Cl. .................................... 359/811; 359/796
(58) Field of Classification Search ............... 359/811, 359/796, 793, 748, 642, 365, 644–646
See application file for complete search history.

(56) References Cited

U.S. PATENT DOCUMENTS 7,268,957 B2 * 9/2007 Frenzel et al. ............... 359/811
2009/0168204 A1 * 7/2009 Nishizawa et al. .......... 359/796

* cited by examiner

*Primary Examiner*—Scott J Sugarman
*Assistant Examiner*—Vipin M Patel
(74) *Attorney, Agent, or Firm*—Andrew C. Cheng

(57) ABSTRACT

An exemplary optical lens assembly includes a first lens and a second lens. The first lens comprises a first central portion and a first annular stepped portion. The first annular stepped portion has a first outer step and a second outer step. The first outer step has a first outer side surface and a first downward-facing surface. The second outer step has a second outer side surface. The second lens comprises a second central portion and a second annular stepped portion. The second annular stepped portion has a first inner step and a second inner step. The first inner step has a first inner side surface and a first upward-facing surface. The second inner step has a second inner side surface. The first annular stepped portion is engaged in the second annular stepped portion. A gap exists between the second outer side surface and the first inner side surface.

14 Claims, 5 Drawing Sheets

OPTICAL LENS ASSEMBLY AND LENS MODULE

CROSS-REFERENCE TO RELATED APPLICATIONS

This application is related to commonly-assigned copending application Ser. No. 12/061,893, entitled "Lens with Collar and Lens Module Using same", and Ser. No. 12/168,785, entitled "Lens Module and Optical Module Incorporating the same". Disclosures of the above-identified applications are incorporated herein by reference.

BACKGROUND

1. Technical Field

The present invention relates to optical imaging devices and, particularly, to an optical lens assembly and a lens module having the same.

2. Description of Related Art

Currently, along with the development of electronic devices with multiple functions, image pick-up apparatuses have become widely used in a variety of consumer electronic devices, such as notebook computers, personal digital assistants (PDAs), cellular telephones, etc. In the meantime, demand for improving image quality is increasing, which is essentially dependent on the quality of a lens module of the image pick-up apparatus. That is, a lens module with high image quality is desired.

Referring to FIG. 5, an optical lens assembly 20 includes two lenses 24, 26. The lens 24 and lens 26 each has a central round portion and a peripheral portion. The peripheral portion of the lens 24 includes a protuberance 242, and the peripheral portion of the lens 26 includes a protuberance 262 coupled with the protuberance 242. The protuberance 242 has a surface 244 and the protuberance 262 has a surface 264. The two surfaces 244, 264 are both incline planes and have the same gradient. When assembling the two lenses 24 and 26, the surfaces 244 and 264 contact each other to engage the lens 24 to the lens 26. However, this combination requires the manufacturing tolerance of the incline plane to be very precise. If the combination is out of tolerance, the inside depth of the lens 26 to lens 24 will be different. This will make the distance between the two lenses 24 and 26 fail to meet specification. The location of contact between the two lenses 24, 26 will be unstable and may cause the lens 26 to become skewed. Furthermore, the axis of the lenses 24 and 26 will not be coincident. Thus, a lens module having the optical lens assembly 20 above may provide distorted images.

Therefore, a new optical lens assembly is desired to overcome the above mentioned problems.

SUMMARY

An exemplary optical lens assembly includes a first lens and a second lens. The first lens comprises a first central portion and a first annular stepped portion surrounding the first central portion. The first annular stepped portion has a first outer step and a second outer step. The first outer step has a first outer side surface and a first downward-facing surface. The second outer step has a second outer side surface and a second downward-facing surface. The second lens comprises a second central portion and a second annular stepped portion surrounding the second central portion. The second annular stepped portion has a first inner step and a second inner step. The first inner step has a first inner side surface and a first upward-facing surface. The second inner step has a second inner side surface and a second upward-facing surface. The first annular stepped portion is engaged in the second annular stepped portion. The first outer side surface is in contact with the second inner side surface. The first downward-facing surface is in contact with the first upward-facing surface. A gap exists between the second outer side surface and the first inner side surface.

Other advantages and novel features of the present invention will become more apparent from the following detailed description of present embodiment when taken in conjunction with the accompanying drawings.

BRIEF DESCRIPTION OF THE DRAWINGS

The components in the drawings are not necessarily drawn to scale, the emphasis instead being placed upon clearly illustrating the principles of the present embodiment. Moreover, in the drawings, like reference numerals designate corresponding parts throughout the several views.

Figure 1:
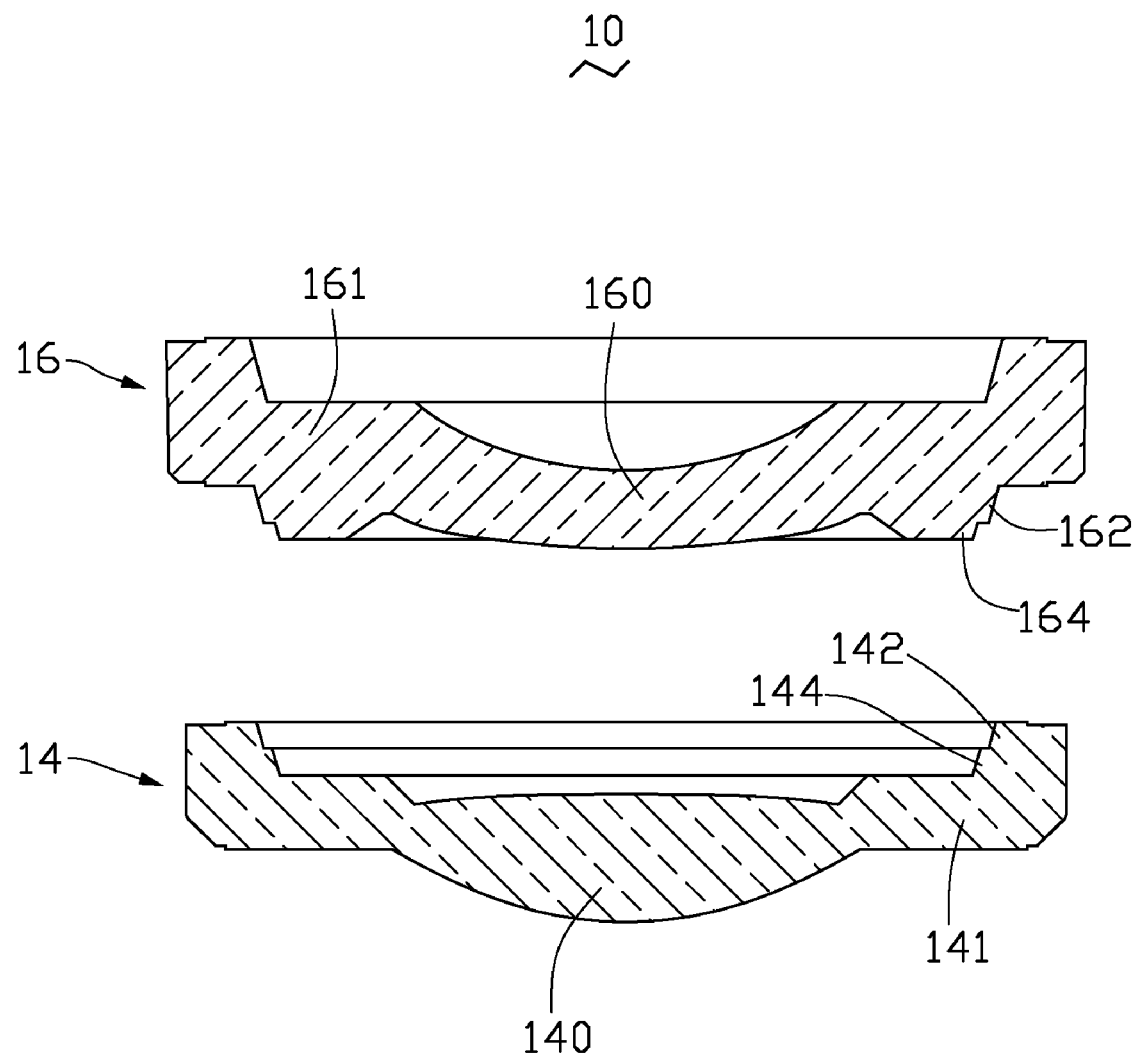
FIG. 1 is a disassembled, cross-sectional view of an optical lens assembly according to an exemplary embodiment.

Corresponding reference characters indicate corresponding parts. The exemplifications set out herein illustrate at least one present embodiment of the present lens module and optical module, in one form, and such exemplifications are not to be construed as limiting the scope of the invention in any manner.

DETAILED DESCRIPTION OF THE EMBODIMENTS

Reference will now be made to the drawings to describe embodiments of the present optical lens assembly in detail.

Figure 2:
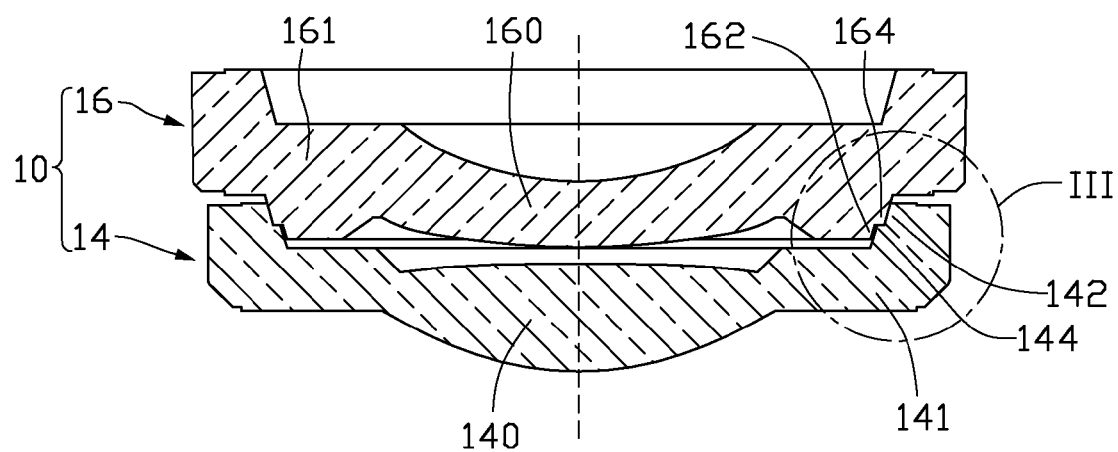
FIG. 2 is an assembled, cross-sectional view of the optical lens assembly shown in FIG. 1.
Figure 3:
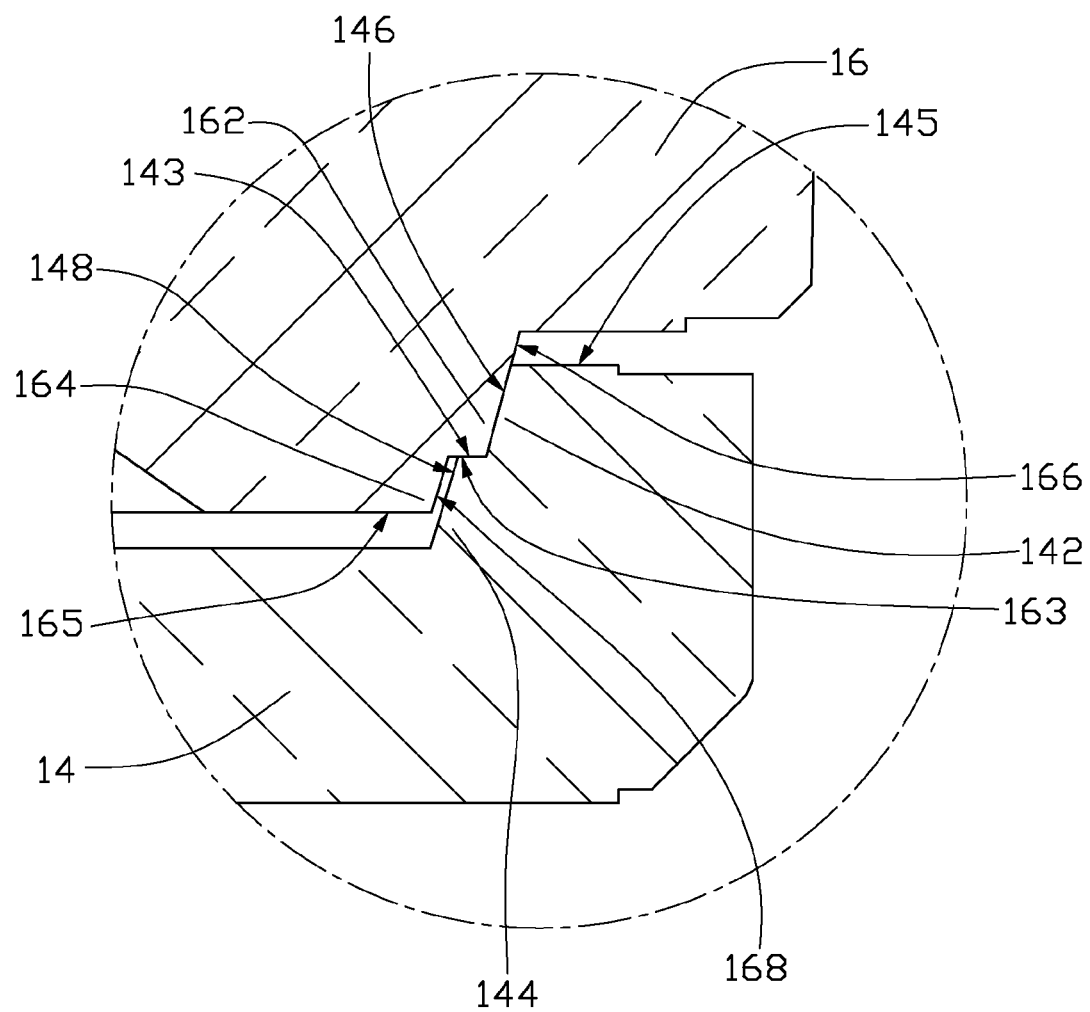
FIG. 3 is an enlarged view of an area III of the optical lens assembly shown in FIG. 2.

Referring to FIG. 1 to FIG. 3, an optical lens assembly 10 of an exemplary embodiment is shown. The optical lens assembly 10 includes a first lens 16 and a second lens 14. The first lens 16 and the second lens 14 can be made of plastic, glass or other optical materials known in the art.

The first lens 16 includes a first central portion 160 and a first annular stepped portion 161 surrounding the first central portion 160. The first central portion 160 is configured for cooperating with other elements to capture images. The first annular stepped portion 161 has a first outer step 162 and a second outer step 164. The first outer step 162 and the second outer step 164 are annular steps surrounding the first central portion 160 of the first lens 16. The first outer step 162 has a first outer side surface 166 and a first downward-facing surface 163. The second outer step 164 has a second outer side surface 168 and a second downward-facing surface 165. The first downward-facing surface 163 adjoins the second outer side surface 168.

The second lens 14 includes a second central portion 140 and a second annular stepped portion 141 surrounding the second central portion 140. The second central portion 140 is configured for cooperating with other elements to capture images. The second annular stepped portion 141 has a first inner step 144 and a second inner step 142. The first inner step 144 and the second inner step 142 are annular steps surrounding the second central portion 140 of the second lens 14. The first inner step 144 has a first inner side surface 148 and a first upward-facing surface 143. The second inner step 142 has a second inner side surface 146 and a second upward-facing surface 145. The first upward-facing surface 143 adjoins the second inner side surface 148.

The first annular stepped portion 161 is engaged in the second annular stepped portion 141. The first outer side surface 166 is in contact with the second inner side surface 146. The first and second outer steps 162, 164 taper in a direction toward the second lens 14. In the present embodiment, the first and second outer steps 162, 164 have a same tapering degree. So the first outer step 162 of the first lens 16 can be received by the first inner step 144.

The first downward-facing surface 163 is in contact with the first upward-facing surface 143. The first upward-facing surface 143 contacting with the first downward-facing surface 163 ensures a fixed distance between the first lens 16 and the second lens 14.

The second downward-facing step surface 165 of the first lens 16 is spaced apart from the second lens 14. The second upward-facing step surface 145 of the second lens 14 is spaced apart from the first lens 16. A gap exists between the second outer side surface 168 and the first inner side surface 148. Assembly of the optical lens assembly by fixing the first lens 16 to the second lens 14 will be easier because a gap is allowed between the first inner side surface 148 and the second outer side surface 168 so no friction between the two surfaces 148, 168 will occur to make fitting difficult.

In assembly, the first outer side surface 166 is guided by the second inner side surface 146. When the first downward-facing surface 163 is in contact with the first upward-facing surface 143, the first lens 16 can be fixed to the second lens 14. As detailed in the previous paragraph the gap allows easier assembly while contact between the surfaces assures accurate positioning. Furthermore, the axis of the lenses 16 and 14 will be coincident. Thus, a lens module having the optical lens assembly 10 will be easy and convenient to accurately assemble and provide better image quality.

Figure 4:
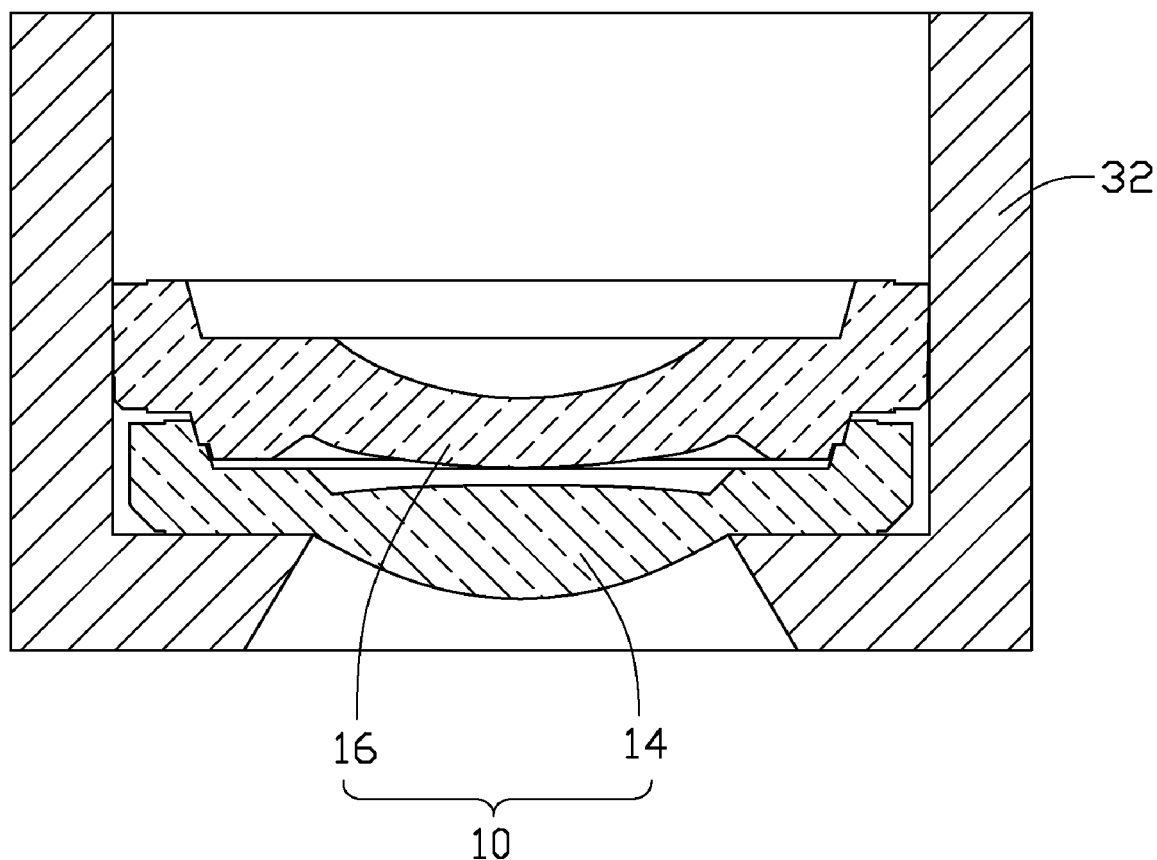
FIG. 4 is an assembled, cross-sectional view of a lens module according to an exemplary embodiment.
Figure 5:
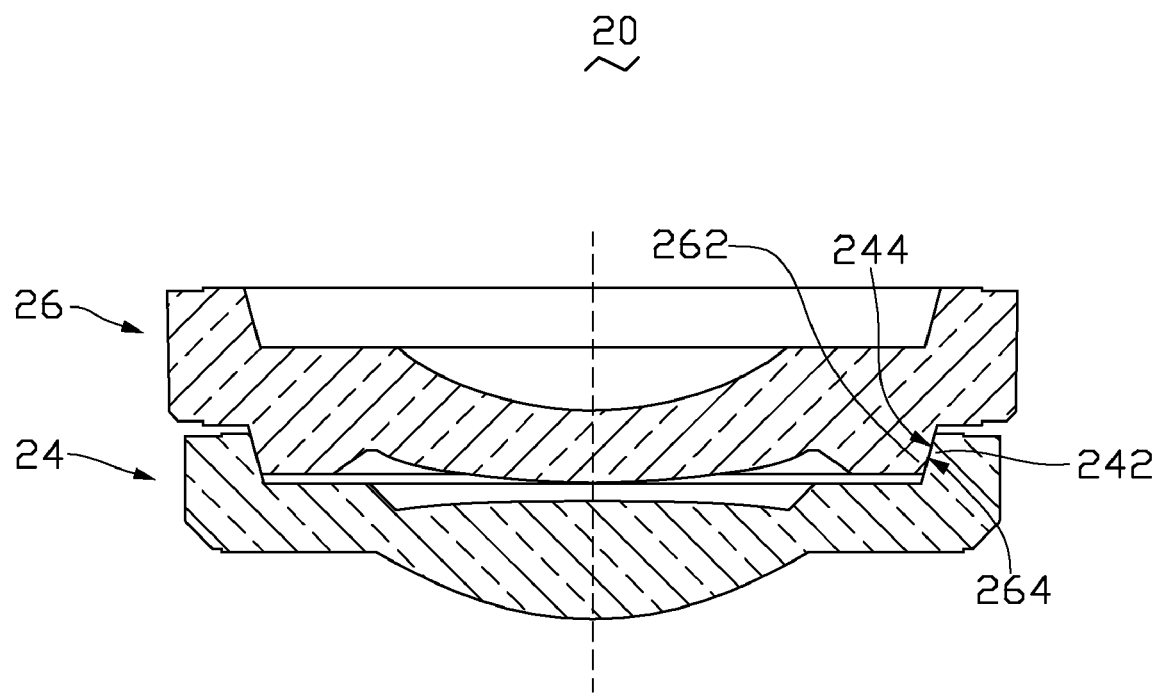
FIG. 5 is a schematic, cross-sectional view of a typical optical lens assembly.

Referring to FIG. 4, a lens module 30 of an exemplary embodiment of an environment utilizing the lens assembly 10 is shown. The lens module 30 includes a barrel 32, and receives the lens assembly 10 therein.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An optical lens assembly comprising:
a first lens comprising a first central portion and a first annular stepped portion surrounding the first central portion, the first annular stepped portion having a first outer step and a second outer step, the first outer step having a first outer side surface and a first downward-facing surface, the second outer step having a second outer side surface and a second downward-facing surface;
a second lens comprising a second central portion and a second annular stepped portion surrounding the second central portion, the second annular stepped portion having a first inner step and a second inner step, the first inner step having a first inner side surface and a first upward-facing surface, the second inner step having a second inner side surface and a second upward-facing surface, the first annular stepped portion engaged in the second annular stepped portion, the first outer side surface being in contact with the second inner side surface, the first downward-facing surface being in contact with the first upward-facing surface, a gap existing between the second outer side surface and the first inner side surface.

2. The optical lens assembly as claimed in claim 1, wherein the second downward-facing surface of the first lens is spaced apart from the second lens.

3. The optical lens assembly as claimed in claim 1, wherein the second upward-facing surface of the second lens is spaced apart from the first lens.

4. The optical lens assembly as claimed in claim 1, wherein the first and second outer steps taper in a direction toward the second lens.

5. The optical lens assembly as claimed in claim 4, wherein the first and second outer steps have a same tapering degree.

6. The optical lens assembly as claimed in claim 1, wherein the first downward-facing surface adjoins the second outer side surface.

7. The optical lens assembly as claimed in claim 1, wherein the first upward-facing adjoins the second inner side surface.

8. A lens module comprising:
a first lens comprising a first central portion and a first annular stepped portion surrounding the first central portion, the first annular stepped portion having a first outer step and a second outer step, the first outer step having a first outer side surface and a first downward-facing surface, the second outer step having a second outer side surface and a second downward-facing surface;
a second lens comprising a second central portion and a second annular stepped portion surrounding the second central portion, the second annular stepped portion having a first inner step and a second inner step, the first inner step having a first inner side surface and a first upward-facing surface, the second inner step having a second inner side surface and a second upward-facing surface, the first annular stepped portion engaged in the second annular stepped portion, the first outer side surface being in contact with the second inner side surface, the first downward-facing surface being in contact with the first upward-facing surface, a gap existing between the second outer side surface and the first inner side surface; and
a barrel receiving the first lens and the second lens therein.

9. The lens module as claimed in claim 8, wherein the second downward-facing surface of the first lens is spaced apart from the second lens.

10. The lens module as claimed in claim 8, wherein the second upward-facing surface of the second lens is spaced apart from the first lens.

11. The lens module as claimed in claim 8, wherein the first and second outer steps taper in a direction toward the second lens.

12. The lens module as claimed in claim 11, wherein the first and second outer steps have a same tapering degree.

13. The lens module as claimed in claim 8, wherein the first downward-facing surface adjoins the second outer side surface.

14. The lens module as claimed in claim 8, wherein the first upward-facing adjoins the second inner side surface.

* * * * *